United States Patent [19]

Petersen

[11] Patent Number: 5,622,205
[45] Date of Patent: Apr. 22, 1997

[54] CHECK VALVE HAVING RESERVED MECHANICAL CLOSURE

[76] Inventor: Robert E. Petersen, R.R. 1 Box 202, 7784 New Liberty Rd., Walcott, Iowa 52773

[21] Appl. No.: 528,134

[22] Filed: Sep. 14, 1995

[51] Int. Cl.⁶ ............................................. F16K 15/00
[52] U.S. Cl. ........................ 137/527.8; 137/242; 251/82
[58] Field of Search ............................. 137/527, 242, 137/527.8; 251/82, 177, 113, 114

[56] References Cited

U.S. PATENT DOCUMENTS

| | | | |
|---|---|---|---|
| 655,741 | 8/1900 | Scott | 251/114 |
| 703,832 | 7/1902 | Rigby | 251/114 |
| 961,738 | 6/1910 | Stickel | 251/114 |
| 4,637,425 | 1/1987 | Petersen | 137/412 |
| 4,887,792 | 12/1989 | Kuo | 251/82 |

*Primary Examiner*—Denise L. Ferensic
*Assistant Examiner*—Joanne Y. Kim
*Attorney, Agent, or Firm*—Glenn H. Antrim

[57] ABSTRACT

A check valve has a pivotal arm for striking a flap against a seal that has a knife edge for cutting occasionally lodged debris. The flap without an integral arm is light to provide minimum resistance to flow of fluid in a normal direction. Greater efficiency permits a spring for biasing an actuating mechanism that is aligned with the pivotal arm to be weaker so that fluid can flow more readily in a normal direction and the spring can be reset easier.

3 Claims, 2 Drawing Sheets

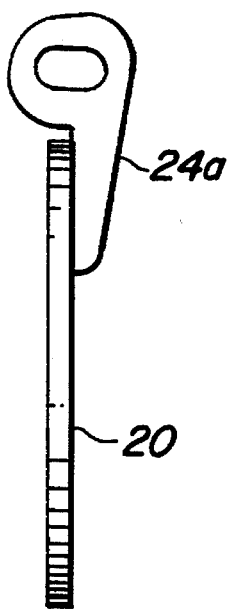
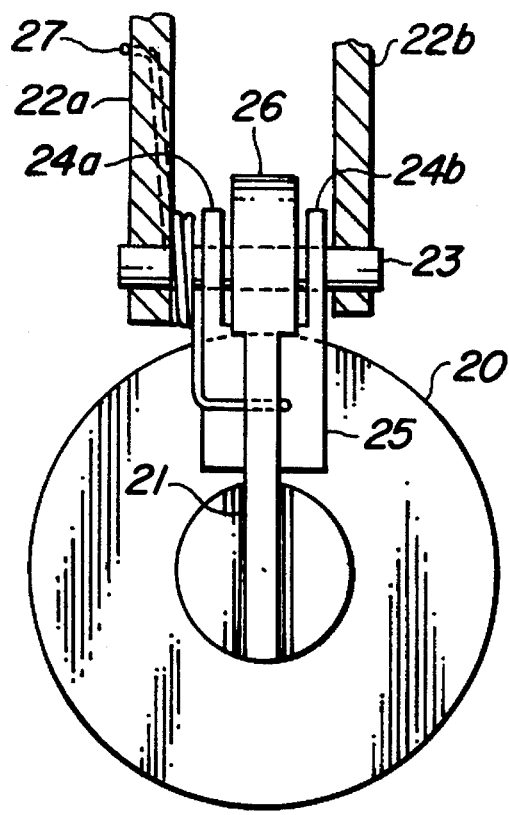

5,622,205

CHECK VALVE HAVING RESERVED MECHANICAL CLOSURE

BACKGROUND OF THE INVENTION

This invention pertains to check valves such as used in sewers and in pipes conveying liquids in manufacturing plants. More particularly, the present check valve relates to mechanical structures for aiding the closing of check valves when closure by force of backup liquid fails to provide tight closure.

The present check valve has mechanical closing structure that provides even more reliable service than that provided by the valve described in the U. S. Pat. No. 4,637,425 issued to the present inventor on Jan. 20, 1987. In addition, the material and the pivot of the flap has been changed to increase reliability while decreasing the cost of manufacture.

SUMMARY OF THE INVENTION

An inlet of the valve for fluid flowing in the desired direction is similar to that shown and described in the patent mentioned above. For sealing the inlet, a flap usually is pressed by backup fluid against a circular knife edge. When tough, pliable material lodges between the flap and the seal, an impact against the flap is required for enabling the contiguous knife edge of the seal to cut and to dislodge the material.

In the former valve, an actuating member is biased by a spring such that when a catch is released, the member strikes a lever that is solidly connected to the flap. Since the impact is sufficient to enable the knife edge to cut through almost any debris that is encountered in usual pipes, a tight seal is obtained. Although the flap and integral arm as used in the valve described in the patent mentioned above are usually light enough to permit the flap to be opened far enough by flow in the normal direction to prevent debris from collecting in the housing of the valve, occasionally, generally after long satisfactory use, debris may collect. Also in the former valve, in order that sufficient force is provided for cutting through fibrous material, the spring for the actuating member is too strong to be reset manually by an elderly person.

In the present valve, the arm that is struck by the actuating member for applying an impact to the flap is pivoted such that the arm can be rotated independently of the positioning of the flap. A torsional spring normally positions the arm away from the flap so that the flap can be more easily opened by normal flow. The use of light plastic, such as 3/32-inch (4.0-mm) thick polycarbonate, for the flap, also decreases the force required for opening.

The pivotal arm of the present valve is a separate striking arm that is struck by the actuating member, and the momentum of both the actuating arm and the striking arm is applied from the actuating member through the striking arm as it strikes the flap. Since the present flap without the integral arm is light and the striking arm increases momentum for ensuring complete closure of the flap, the spring for biasing the actuating member can be weaker and still provide the required cutting force.

BRIEF DESCRIPTION OF THE DRAWING

FIG. 1 is a longitudinal, cross-sectional view of the present valve showing a pivotal striking arm for transmitting force from an actuating member to a flap;

FIG. 3 is an elevation view of the striking arm and pivot as looking toward the inlet of the valve; and FIG. 4 is a side view of a portion of the flap and an integral member for connecting the flap to the shaft of the pivot.

DESCRIPTION OF THE PREFERRED EMBODIMENT

Figure 2:
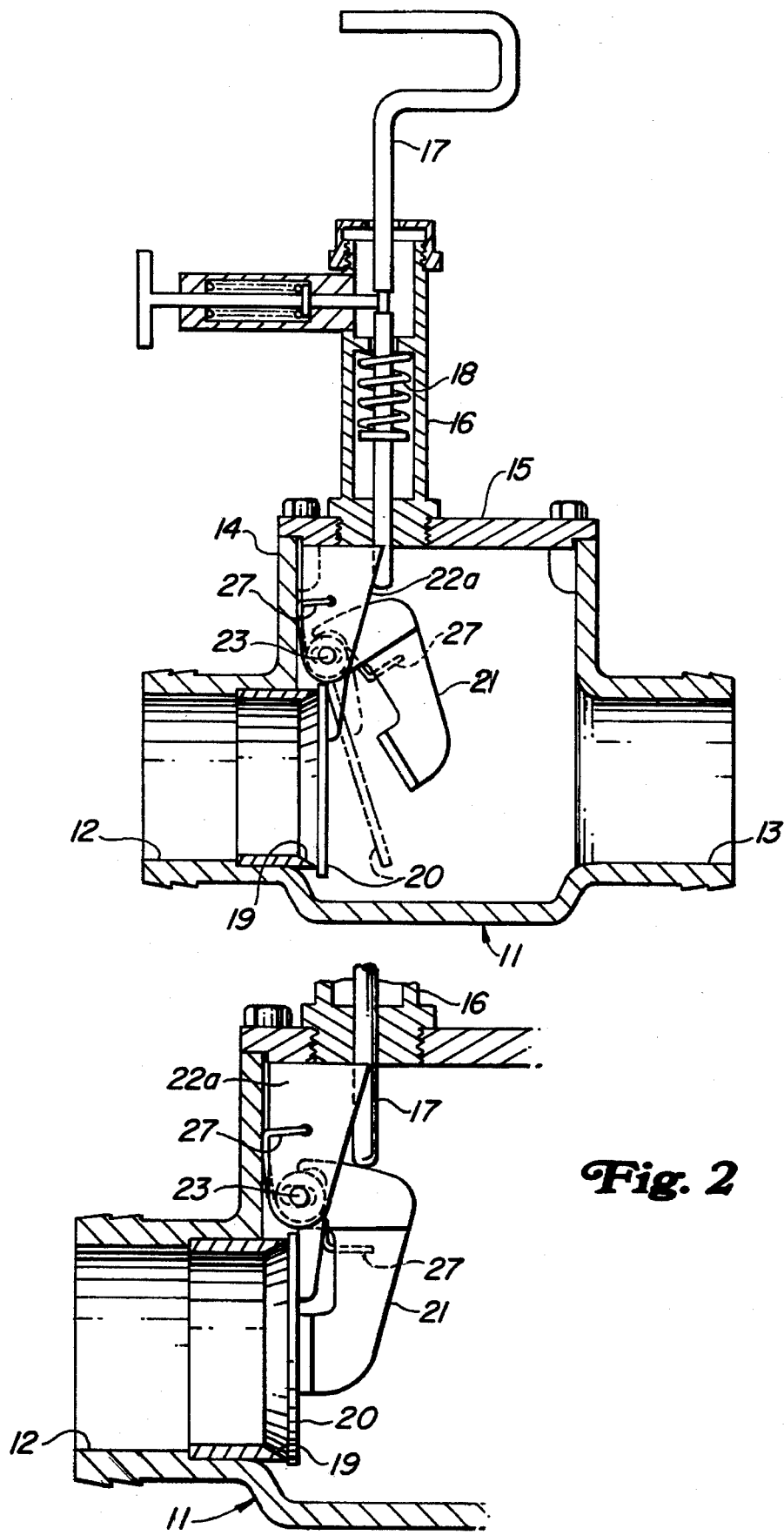
FIG. 2 is a fragmentary view of FIG. 1 as the actuating member is positioned to close the valve.

A usual cast housing 11 of the check valve of FIG. 1 has an inlet 12 and an opposite outlet 13. The housing 11 has above the space for usual fluid flow, an upper portion 14 to which is bolted a cover 15. A tubular portion 16 of the cover 15 extends upward from the cover 15 on a vertical line that is short distance from the inlet 12 and centered laterally with respect to the housing 11 so as to be over a point that is in alignment with of the axis of the inlet 12. The tubular portion 16 has sufficient inside diameter to receive a rigid actuating member 17, such as a round rod, and a coil spring 18 positioned coaxially about the rod. When the actuating member 17 is unlatched from an upward position, the spring forces the member downward in the housing on a path toward the point in alignment with the axis of the inlet 12.

As described in U.S. Pat. No. 4,637,425, a seat for the inlet 12 comprises a cylinder with a knife edge 19 to be contacted by a flap 20. In the present valve, the actuating member 17 is aligned with an upper portion of a pivoted striking arm 21. The actuating member 17 in response to being unlatched strikes the arm 21 and follows it until the arm strikes the flap 20 such that the momentum of the actuating member 17 and the striking arm 21 reinforce for providing a substantial impact to the closed or almost closed flap 20.

For positioning a pivotal shaft 23 of both the flap 20 and the striking arm 21 a short distance from the flap 20 and in line with the vertical diameter of the flap 20 as viewed in a closed position, a pair of supporting members 22a–b (FIGS. 1 and 3) depend from the cover 15 for the required distance to receive horizontally through their lower ends the pivotal shaft 23. The lower end of each of the parallel supporting members 22a–b has a hole on a horizontal line that is substantially in the plane of the flap 20, for receiving tightly the pivotal shaft 23.

With reference to FIG. 3, the pivotal shaft 23 extends through one of the two forked arms 24a–b of a metal extension 25 secured to the flap 20, a bearing portion 26 of the striking arm 21, and the other forked arm of the flap 20. The supporting members 22a–b (FIGS. 1 and 3) are spaced apart the required distance to permit the flap 20 and the striking arm 21 to turn freely on the shaft 23 while accommodating a turn of a torsional spring 27, the spring rotating the striking arm 21 away from the closed position of the flap 20 while the actuating member 17 is withdrawn. The end of the torsional spring 27 extending the farthest from the pivotal shaft 23 is shaped to be hooked under the midsection of the striking arm 21, and the shorter end of the torsional spring 27 hooks about the adjacent pivot support 22a for positioning the striking arm in a slanted position as shown in FIG. 1 while the actuating arm member is withdrawn.

Had the former bearing portions 24a–b of the flap 20 having precise round bearing surfaces been retained, the machining during manufacture would have to be very accurate to insure a seal between the flap 20 and the knife edge 19. Since the closing force either from the backup flow or from the striking arm 21 tends to be centrally applied for pressing the flap 20 tightly against the knife edge 19, the bearing surface through the bearing portion 24a–b may be elongated in a direction perpendicular to the surface of the flap 20 for permitting precise closure of the check valve without requiring precise, expensive machining. Obviously, the semicircular ends of the bearing surfaces retain the diameter required for the shaft 23, and the intermediate portions are parallel.

Normally, the actuating member 17 is latched in an upper position, and the torsional spring 27 positions the striking arm 21 in the slanting position as shown in FIG. 1. Then flow of liquid in the normal direction can easily open the light flap 20 as much as required toward the position shown in the broken lines in FIG. 1 for permitting full flow of liquid. In response to backup flow having entered the housing 15, the flap 20 will be in a closed position as shown in full lines. When required, the actuating member 17 is released to permit the spring 18 to drive the member 17 downward for striking the upper portion of the striking arm at a position spaced from the pivotal shaft 23. The striking arm has a slightly obtuse, intermediate bend in the edge encountered by the lower end of the actuating member so that the actuating member 17 strikes rather squarely on the upper portion of the striking arm. The impact drives the lower end of the striking arm 17 in contact with central portion of the flap 20 that is in a closed or nearly closed position as shown in FIG. 2. Any debris between the flap and the knife edge 19 is therefore almost certain to be cut through, and sufficient space is below the knife edge 19 to permit the cut portions to clear the seal. Providing no substantial backup flow is present and substantial pressure is provided by fluid that is to flow in the normal direction, the tension of the spring 18 as opposed by the opposite force of the torsional spring 27 is not sufficient to prevent the substantial normal flow. After undesirable back flow is no longer present, the actuating member is secured in its upper position to permit fluid to flow readily in the normal direction.

I claim:

1. A fluid check valve having a housing with a valve chamber, an inlet for passing a flow of fluid in a normal direction, said inlet having a sealing surface facing into said valve chamber, a flap having a first pivot connected to said housing approximate said inlet, said flap normally being turned about said first pivot to an open position by flow of fluid in a normal direction through said valve and to a closed position by force of backup fluid in an opposite direction, an outer surface of said flap in said closed position being in tight contact with said sealing surface, an actuating mechanism having a rigid member, means for constantly urging said rigid member toward said flap, means for normally retaining said rigid member at a predetermined distance from said flap, means for releasing said rigid member, an arm connected to said flap for receiving impact from said released rigid member for applying force in addition to force applied by backup fluid, wherein the improvement comprises:

said arm being a striking arm having a second pivot connected to said valve housing at a point approximate said flap and substantially in the plane of the flap, said striking arm extending from said second pivot for a sufficient distance for striking said flap at a point to propel said flap to said closed position, said striking arm normally being positioned about said second pivot to provide a substantial gap between said striking arm and said flap, said striking arm having a portion spaced from said second pivot, said portion of said striking arm being struck by said rigid member upon release thereof for receiving momentum of said rigid member when released for rotating said arm in the direction to strike said flap whereby said momentum of said rigid member and momentum of said striking arm are combined and applied to said flap for ensuring tight closing of said flap against said sealing surface.

2. A check valve as claimed in claim 1 wherein said flap has said first pivot in the plane of and a short distance outside the circumference of said flap, said first pivot permitting sufficient freedom of motion of said flap in a direction perpendicular to the surface of said flap to ensure that said outer surface of said flap can be readily oriented to bear tightly against said sealing surface.

3. A check valve as claimed in claim 1 wherein a torsional spring is positioned about said second pivot, said torsional spring being connected between said housing and said striking arm for biasing said arm in a direction tending to rotate said arm away from said flap such that said flap is more easily opened by said flow of fluid in a normal direction.

* * * * *